Feb. 4, 1969

G. H. BJORK 3,425,216

MUFFLER

Filed Jan. 31, 1967

INVENTOR.
GUST H. BJORK
BY
Burd, MacEachron, Braddock,
Bartz & Schwartz
ATTORNEYS Feb. 4, 1969

G. H. BJORK 3,425,216

MUFFLER

Filed Jan. 31, 1967

INVENTOR.
GUST H. BJORK
BY
Burd, MacEachron, Braddock,
Bartz & Schwartz
ATTORNEYS

United States Patent Office 3,425,216
Patented Feb. 4, 1969

3,425,216
MUFFLER
Gust H. Bjork, Robbinsdale, Minn., assignor to Pure Air Mufflers, Inc., a corporation of Minnesota
Filed Jan. 31, 1967, Ser. No. 612,993
U.S. Cl. 60—30     8 Claims
Int. Cl. F01n 3/02, 1/14; B01j 9/00

ABSTRACT OF THE DISCLOSURE

A pollution reducing muffler for internal combustion engines having a fresh air aspirating inlet for exhaust gases, and a long narrow gas receiving chamber connected along one side to a similar parallel gas discharge chamber through multiple passages for distributing the gases in their path of travel through the muffler. The muffler reduces pollution by promoting further combustion of combustible constituents of the exhaust gases.

---

This invention relates to a system for the reduction of objectionable constituents in exhaust gases from internal combustion engines, such as automobile engines and the like. More particularly the invention relates to a muffler device for attachment to the exhaust manifold of an automotive engine or the like for the reduction of the quantities of unburned hydrocarbons and carbon monoxide emited from the exhaust system of the engine. The muffler of the present invention is especially useful for reducing air pollution from internal combustion engines used indoors, such as fork lift trucks in warehouses, industrial sweepers and the like.

The exhaust gases from the average automobile and similar internal combustion engine contain a mixture of carbon monoxide, carbon dioxide, unburned or partially burned hydrocarbons, nitrogen, some of the nitrogen oxides, and, under certain conditions, portions of unconsumed air. It is reasonably well established that these automobile exhaust gases and similar exhaust gases from other internal combustion engines contribute to the production of smog. In certain urban areas smog is produced in such quantities as to be considered objectionable and potentially harmful. As a result, states have begun to legislate against the introduction into the atmosphere of gases which contribute to smog production. Exemplary of this is legislation enacted in California which establishes a maximum permissible content of hydrocarbon in escaping automobile exhaust of 275 parts per million and maximum carbon monoxide content of 1.5 percent. More stringent requirements have been proposed by which maximum permissible hydrocarbon would be reduced to 180 p.p.m. and maximum carbon monoxide to 1.0 percent.

Prior attempts to reduce the unburned hydrocarbon and carbon monoxide content in automobile exhaust have principally been in the form of so-called "after burners" for direct oxidation of the undesired materials with excess air at high temperatures above about 2000° F. and catalytic converters for catalytically oxidizing the unwanted materials with excess air at lower temperatures of the order of 500° F. However, neither of these systems has proved completely satisfactory under the wide variety of operating conditions which must be met in the course of operation of an automobile in normal use.

The principal object of this invention is to provide a simple muffler system for exhaust gases from internal combustion engines to effectively reduce the content of objectionable gaseous constituents.

The invention is illustrated by the accompanying drawings in which the same numerals refer to corresponding parts and in which.

Figure 1:
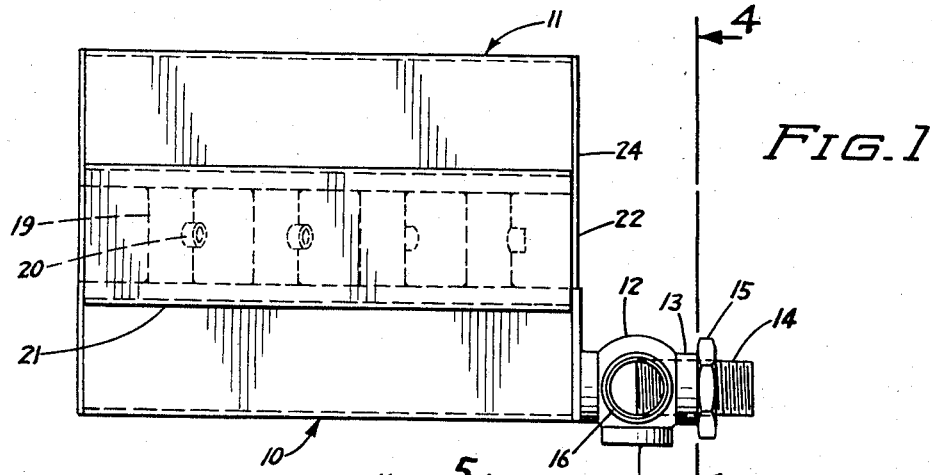
FIGURE 1 is a side elevation of a muffler device according to the present invention.
Figure 2:
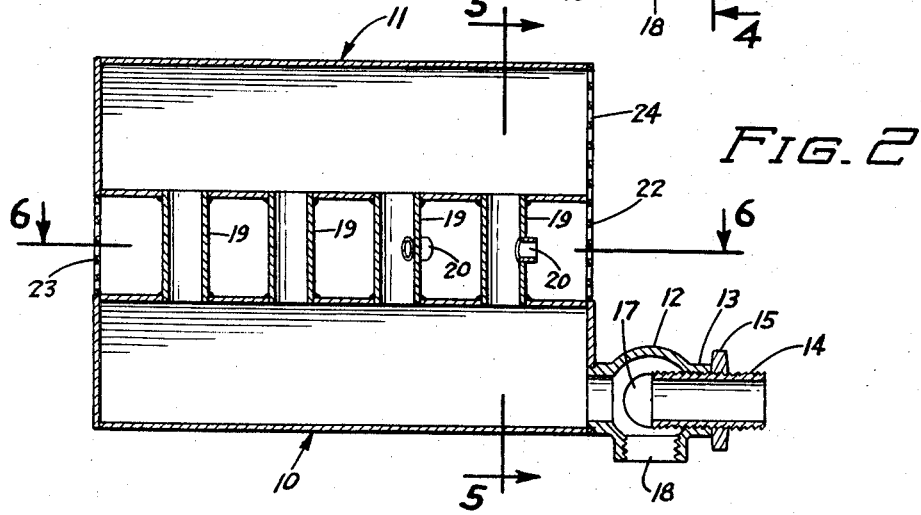
FIGURE 2 is a vertical longitudinal section on the line 2—2 of FIGURE 6 and in the direction of the arrows.
Figure 3:
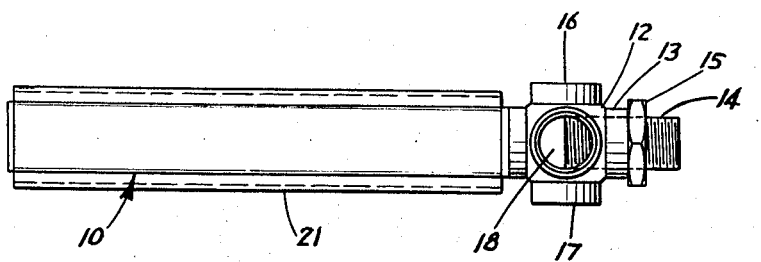
FIGURE 3 is a bottom plan view.
Figure 4:
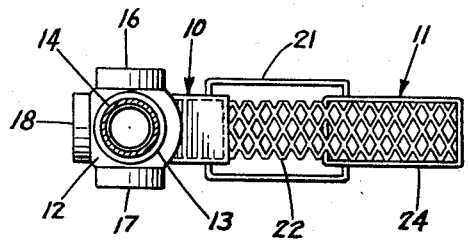
FIGURE 4 is an end view partly in section on the line 4—4 of FIGURE 1 and in the direction of the arrows.
Figure 5:
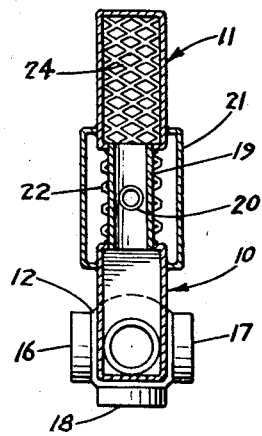
FIGURE 5 is a transverse section on the line 5—5 of FIGURE 2 and in the direction of the arrows.
Figure 6:
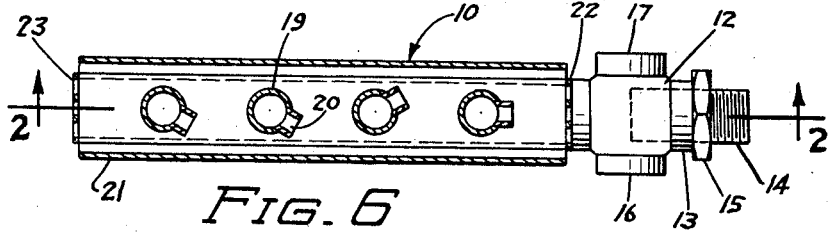
FIGURE 6 is a transverse section on the line 6—6 of FIGURE 2 and in the direction of the arrows.

Referring now to the drawings and particularly to FIGURES 1 through 6, the muffler according to the present invention includes an elongated tubular exhaust-receiving housing closed at both ends, indicated generally at 10. A corresponding elongated tubular exhaust-discharge housing, indicated generally at 11, is disposed generally parallel to the first housing and in direct fluid communication with housing 10 along one side. An exhaust gas and air inlet fitting 12 is in direct communication with the exhaust-receiving housing 10 through one of the closed ends thereof. Fitting 12 is provided with one threaded port 13 into which is fit a threaded pipe or tube 14 held by a lock nut 15 and connected to the exhaust manifold of the internal combustion engine with which the muffler device is to be used. Fitting 12 is provided with a plurality of fresh air inlet ports 16, 17 and 18.

Exhaust gas inlet pipe 14 desirably extends well into the interior chamber of fitting 12, at least as far as the longitudinal axes of the ports so as to partially intersect the flow paths of air through the air inlet ports. The exhaust gases from the exhaust manifold of the internal combustion engine with which the muffler is used are at high temperatures and traveling at high velocity as they pass through pipe 14 and fitting 12 into the exhaust receiving housing 10. The high velocity gas flow through fitting 12 produces a venturi effect, drawing fresh cool air through the air inlet ports 16, 17 and 18.

The admixture of hot exhaust gases with an excess of cool fresh air causes combustion of carbon monoxide, hydrocarbons and other combustible constituents of the exhaust gas, along with a simultaneous partial cooling of the exhaust gases. This occurs to large extent in the exhaust receiving housing 10. The partially consumed exhaust gases exit from housing 10 along one side through a plurality of ducts or tubes 19 communicating with housing 11. Ducts or tubes 19 are spaced along the length of housings 10 and 11. Each duct 19 is provided with at least one air inlet port 20. The high velocity flow of partially consumed hot exhaust gases through ducts 19 creates a further venturi effect to draw further cool fresh air through ports 20 to assist in further oxidation and combustion of combustible constituents of the exhaust gases.

Ducts 19 are desirably enclosed within an elongated tubular housing 21 whose sidewalls extend between the housings 10 and 11 to strengthen and rigidify the structure. Screens 22 and 23, which are desirably formed from so-called expanded metal sheeting, desirably partially close the open ends of the tubular enclosure 21. Air is freely drawn into the enclosed area through and around the screens.

By the time the exhaust gases have passed through ducts 19 into housing 11, the combustible constituents are virtually completely consumed. The spent exhaust gases are then discharged to the atmosphere through screen 24 covering one end of housing 11. If desired, both ends of housing 11 may be open to the atmosphere, preferably screened and desirably with expanded metal sheeting.

Figure 7:
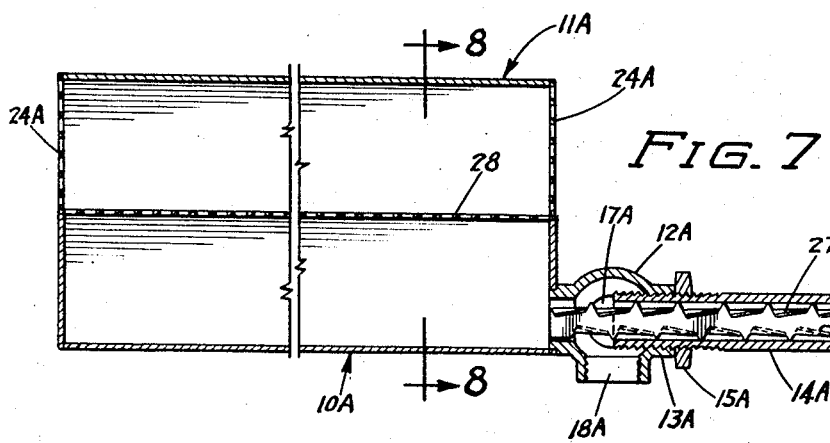
FIGURE 7 is a side elevation in section of a modified form of muffler device according to the present invention.
Figure 8:
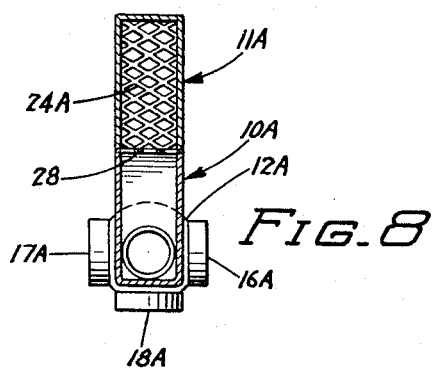
FIGURE 8 is a transverse section on the line 8—8 of FIGURE 7 and in the direction of the arrows.
Figure 9:
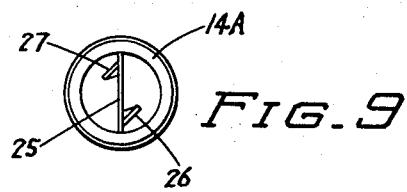
FIGURE 9 is a fragmentary end view on the line 9—9 of FIGURE 7 and in the direction of the arrows.

Referring now to FIGURES 7, 8 and 9, there is shown a somewhat modified form of muffler utilizing the principles of the present invention. Again, the muffler includes an elongated tubular exhaust gas receiving housing 10A closed at both ends but adapted to receive exhaust gases at one end, and a companion exhaust gas discharge housing 11A having a screened gas distribution opening 24A at at least one end and in direct communication with housing 10A. The exhaust gases are introduced to housing 10A through a fitting 12A, as previously described, with a gas inlet port 13A into which a connecting pipe or tube 14A is fit and secured by means of locking nut 15A. Fitting 12A is provided with one or more fresh air inlets 16A, 17A and 18A.

The end of the connecting pipe 14A extending into fitting 12A is desirably provided with a baffle plate 25 in the form of a narrow elongated rigid metal strip of width approximately equal to the inside diameter of type 14A. A plurality of fins 26 and 27 are stamped in the opposite edges of baffle 25 in staggered relation. The fins 26 along one edge of baffle 25 are bent or folded in one direction and fins 27 along the opposite edge of baffle 25 are bent or folded in the opposite direction. The space between the fold line of each fin and the inside wall of pipe 14A provides a port. The high velocity flow of exhaust gases through pipe 14A and through those ports adjacent the fins has a spiral flow direction imparted to it to promote even better admixture of fresh air through ports 16A, 17A and 18A with the exhaust gases. Baffle 24 may likewise be utilized in connection with the structure of the muffler of FIGURES 1 through 6.

The hot exhaust gases and admixed air enter housing 10A where virtually all of the combustible constituents of the exhaust gases are oxidized and consumed. These gases then pass through the multiple passages of the screened common wall 28 between housings 10A and 11A and are exhausted to the atmosphere through one or both ends of housing 11A. The screened barrier wall 28 is desirably formed from expanded metal sheeting.

The muffler parts are made from heat resistant materials. For example, the chamber housings and screen members are desirably formed from stainless steel. The baffle 25, when used, is also desirably formed from stainless steel. Fitting 12 may be a bronze casting. Pipe 14 may be formed from copper, as may ducts 19. Instead of using high heat resistant metals or metallic alloys, less heat resistant metals provided with a refractory ceramic coating may be used to form part or all of the muffler system. The position of the muffler is immaterial, whether horizontal or vertical, upright or on its side. The muffler size may vary with the size of the engine with which it is to be used. In a typical muffler used in conjunction with a 40–50 horsepower gasoline motor on a fork-lift truck or sweeper, the housings 10 and 11 have been about 12 x 3 x 1½ inches spaced about 2 inches apart. For larger engines the unit may have a total length as great as 3 feet or more.

Although not desired to be bound by any particular theory, it is believed that the reduction in pollutants in the exhaust fumes is primarily the result of oxidation occurring as a result of the presence of relatively high temperatures and an abundant air supply, with possibly a catalyzing effect due to presence of metallic components of the muffler. The exhaust gases are at a temperature of the order of about 600° F., at the time they aspirate air into the fitting 12 and into the muffler body. The air is thoroughly and uniformly admixed with the exhaust gases. By use of the muffler according to the present invention, the normal 7 to 8 percent carbon monoxide content of automobile engine exhaust has been reduced to as low as about 0.004–0.005 percent or lower, with corresponding reduction in hydrocarbon noxious constituents.

It is apparent that many modifications and variations of this invention as hereinbefore set forth may be made without departing from the spirit and scope thereof. The specific embodiments described are given by way of example only and the invention is limited only by the terms of the appended claims.

I claim:
1. A pollution reducing muffler for an internal combustion engine comprising:
(A) a first elongated tubular exhaust gas receiving housing of heat resistant metal,
(B) said housing being closed at one end and having a fume inlet at the other,
(C) a multi-port aspirating fitting in direct communication with said fume inlet,
(D) said fitting including an exhaust fume inlet duct and a plurality of air inlet ports,
(E) said exhaust fume inlet duct of the aspirating fitting being in alignment with the fume inlet to said first housing,
(F) the axes of said air inlet ports to said fitting lying in a common plane extending transversely of the axis of said duct,
(G) the downstream end of said duct extending into said fitting at least as far as said air inlet port axes,
(H) a second elongated tubular exhaust gas discharge housing of heat resistant metal,
(I) said second housing corresponding generally in size and shape and being disposed generally parallel to said first housing,
(J) said second housing being open to the atmosphere on at least one end, and
(K) means communicating between said first and second housing along the length thereof for passage of fumes from the first to the second housing.

2. A muffler according to claim 1 further characterized in that said housings are generally rectangular in cross-section.

3. A muffler according to claim 1 further characterized in that a flat elongated baffle plate is disposed in said fume inlet duct, said baffle plate having outwardly projecting fins in staggered relation along each edge, the fins on one side of said plate extending in one direction and the fins on the opposite side of said plate extending in the opposite direction to impart spiral flow to the exhaust fumes.

4. A muffler according to claim 1 further characterized in that said first and second housings are spaced apart and interconnected along the length thereof by means of a plurality of spaced apart air aspirating ducts extending between the housings, each of said ducts having an air inlet port intermediate of its length.

5. A muffler according to claim 4 further characterized in that said ducts are enclosed in a tubular housing open at each end, the walls of said further housing extending between said first and second housing and the ends thereof being at least partially covered by screen means.

6. A muffler according to claim 1 further characterized in that said first and second housings are immediately adjacent to one another and interconnected along the length thereof by a common wall provided with a plurality of gas distributing passages spaced over its entire area.

7. A muffler according to claim 6 further characterized in that said common wall is formed from stainless steel expanded metal sheeting.

8. A muffler according to claim 1 further characterized in that said second exhaust gas discharge housing is open to the atmosphere at each end and said open ends are covered by screen means.

References Cited

UNITED STATES PATENTS

| | | | |
|---|---|---|---|
| 2,834,657 | 5/1958 | Houdry | 23—288 |
| 3,043,096 | 7/1962 | McLoughlin | 60—30 |
| 3,186,806 | 6/1965 | Stiles | 60—30 X |
| 3,232,373 | 2/1966 | Bjork | 60—30 X |

AL LAWRENCE SMITH, *Primary Examiner.*

U.S. Cl. X.R.

181—43, 51; 23—288; 60—93